United States Patent
Enke

(10) Patent No.: US 10,422,415 B2
(45) Date of Patent: Sep. 24, 2019

(54) METHOD FOR OPERATING A MULTISPEED TRANSMISSION IN A MOTOR VEHICLE

(71) Applicant: AUDI AG, Ingolstadt (DE)

(72) Inventor: Martin Enke, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 4 days.

(21) Appl. No.: 15/745,826

(22) PCT Filed: Aug. 9, 2016

(86) PCT No.: PCT/EP2016/068940
§ 371 (c)(1),
(2) Date: Jan. 18, 2018

(87) PCT Pub. No.: WO2017/036742
PCT Pub. Date: Mar. 9, 2017

(65) Prior Publication Data
US 2018/0209514 A1    Jul. 26, 2018

(30) Foreign Application Priority Data

Sep. 3, 2015 (DE) .......................... 10 2015 011 519

(51) Int. Cl.
| | |
|---|---|
| *F16H 3/66* | (2006.01) |
| *B60W 10/06* | (2006.01) |
| *F16H 61/04* | (2006.01) |
| *F16H 61/68* | (2006.01) |
| *B60W 10/115* | (2012.01) |
| *B60W 30/18* | (2012.01) |
| *F16H 61/686* | (2006.01) |
| *F16H 3/44* | (2006.01) |
| *F16H 59/18* | (2006.01) |

(52) U.S. Cl.
CPC .............. *F16H 3/66* (2013.01); *B60W 10/06* (2013.01); *B60W 10/115* (2013.01);
(Continued)

(58) Field of Classification Search
None
See application file for complete search history.

(56) References Cited

U.S. PATENT DOCUMENTS

| | | | |
|---|---|---|---|
| 2008/0207373 A1* | 8/2008 | Conlon | B60K 6/365 475/5 |
| 2009/0248265 A1* | 10/2009 | Tabata | B60K 6/365 701/59 |

(Continued)

FOREIGN PATENT DOCUMENTS

| | | |
|---|---|---|
| DE | 102005002337 A1 | 8/2006 |
| DE | 102007011507 A1 | 9/2008 |

(Continued)

OTHER PUBLICATIONS

Examination Report dated Jun. 20, 2016 of corresponding German application No. 102015011519.7; 5 pgs.

(Continued)

*Primary Examiner* — Colby M Hansen
(74) *Attorney, Agent, or Firm* — Maier & Maier, PLLC

(57) ABSTRACT

A method for operating a multispeed transmission in a motor vehicle, provided with planetary gearings which can be switched with four switching elements to different gear ratios, and which can be connected by input elements and output elements to a driven input shaft and to an output shaft. The reaction elements can be coupled or locked with a brake, wherein the four planetary gearings can be switched by two brakes and by three shifting clutches to eight forward gear ratios. In the higher gear ratios, at least one first shifting clutch is connected to produce a force flow in the transmission, and in the lower gear ratios, at least a second shifting clutch is connected to produce a force flow in the transmission.

8 Claims, 2 Drawing Sheets

(52) U.S. Cl.
CPC ... *B60W 30/18072* (2013.01); *F16H 61/0437* (2013.01); *B60W 2030/1809* (2013.01); *B60W 2510/104* (2013.01); *B60W 2710/1005* (2013.01); *B60W 2710/1066* (2013.01); *B60Y 2300/18083* (2013.01); *F16H 61/686* (2013.01); *F16H 2003/442* (2013.01); *F16H 2059/186* (2013.01); *F16H 2061/0481* (2013.01); *F16H 2200/006* (2013.01); *F16H 2200/2012* (2013.01); *F16H 2200/2043* (2013.01); *F16H 2200/2046* (2013.01); *F16H 2200/2064* (2013.01); *F16H 2200/2094* (2013.01); *F16H 2312/14* (2013.01); *Y02T 10/76* (2013.01)

(56) References Cited

U.S. PATENT DOCUMENTS

2010/0032218 A1* 2/2010 Ideshio ............... B60L 50/16
180/65.225

2010/0069196 A1* 3/2010 Shibata ............... B60W 20/30
477/3

FOREIGN PATENT DOCUMENTS

| DE | 102010000857 A1 | 7/2011 |
| DE | 102011005320 A1 | 9/2012 |
| DE | 102012220768 A1 | 5/2014 |
| DE | 102013200946 A1 | 7/2014 |
| EP | 2269882 B1 | 12/2012 |
| EP | 2383492 B1 | 6/2013 |

OTHER PUBLICATIONS

International Search Report dated Oct. 24, 2016 of corresponding International application No. PCT/EP2016/068940; 12 pgs.
Notification of Transmittal of Translation of the International Preliminary Report on Patentability dated Mar. 15, 2018, in connection with corresponding international Application No. PCT/EP2016/068940 (6 pgs.).

* cited by examiner

Fig. 2

| Gear | Brake A | Brake B | Clutch C | Clutch D | Clutch E | Gear-ratio RS1 | Gear-step RS2 |
|---|---|---|---|---|---|---|---|
| 1 | ● | | ● | | | 4,70 | |
| 2 | ● | ● | | | ● | 3,13 | 1,50 |
| 3 | | ● | ● | | ● | 2,10 | 1,49 |
| 4 | | ● | | ● | ● | 1,67 | 1,26 |
| 5 | | ● | ● | ● | | 1,29 | 1,30 |
| 6 | | | ● | ● | ● | 1,00 | 1,29 |
| 7 | ● | | | ● | ● | 0,84 | 1,19 |
| 8 | ● | | | ● | ● | 0,67 | 1,25 |
| R | ● | ● | | ● | | – | Total 7,05 |

METHOD FOR OPERATING A MULTISPEED TRANSMISSION IN A MOTOR VEHICLE

FIELD

The invention relates to a method for operating a multispeed transmission in a motor vehicle.

BACKGROUND

Such a multispeed transmission can be realized in a planetary construction and it can be provided for example with a hydro-dynamically operating torque converter which is used as a starting element. The sets of the planetary gear in the multispeed transmission can be switched on for example by means of friction or with switching elements such as clutches and brakes.

From DE 10 2005 002 337 A1 is know a generic multispeed transmission in which the method according to the invention can be employed. The multispeed transmission is provided with a total of four planetary gears arranged one after another, which can be connected via input elements and output elements with a driven input shaft and with an output shaft. The four planetary gears can be switched by means of two brakes as well as by means of three clutches to a total of eight forward gear ratios.

In the multispeed transmissions mentioned above, one of the shifting clutches is continuously connected to the higher gear ratios, and in particular to the fourth through the eighth gear ratio, in order to produce a force flow in the transmission. To provide a coasting mode in these higher gear ratios, it is possible to open the clutch which is permanently connected in the higher gears in order to interrupt the force flow in the transmission.

In the coasting mode, it is a common practice to decouple the drive unit from the output, and in particular for example by interrupting the force flow between the input shaft of the transmission and the output shaft of the transmission. In this case, the motor vehicle rolls unimpeded without consuming fuel or with a reduced fuel consumption, as well as without a drag torque on the side of the drive unit, so that the fuel consumption can be reduced. Such a coasting mode is known for example from DE 10 2010 000 857 A1.

SUMMARY

The object of the present invention is to provide a method for operating a multispeed transmission in which the availability of the coasting mode is improved in comparison to prior art.

According to the present invention, the first clutch D is opened in the higher gear ratio in order to provide the coasting mode. On the other hand, the second or the third clutch C, E is opened in order to provide the coasting mode in the lower gear ratios. This ensures that the coasting mode can be activated not only at higher speed ranges, but also at lower speed ranges, which means that the availability of the mode for the user of the vehicle is improved.

In a technical implementation of the multispeed transmission, the four planetary gears can be arranged axially one after another. The input shaft can be guided radially within three hollow inner shafts, which are arranged axially one after another and among which the inner hollow shaft supports in a rotationally fixed manner the sun wheels of the first and of the second planetary gear and in which it can be braked by means of a brake at the transmission housing.

The second inner hollow shaft can support in a rotationally fixed manner the sun wheel of the third planetary gear, and it can be connected in a fixed manner by means of a connecting flange as well as with a second outer hollow shaft to the hollow wheel of the second planetary gear. Moreover, the second inner hollow shaft can be operatively connected via the third clutch to the third inner hollow shaft. The third inner hollow shaft, which supports the sun wheel of the fourth planetary gear in a rotationally fixed manner, can be connected via the second clutch C to the input shaft, and via a second connection flange, a fourth outer hollow shaft can be connected in a rotationally fixed manner to the hollow wheel of the third planetary gear.

In addition, the web of the first planetary gear can be connected in a rotationally fixed manner via a radially external outer shaft to the hollow wheel of the fourth planetary gear. The hollow wheel of the first planetary gear can be braked by applying a second brake B at the transmission housing, while the web of the third planetary gear can be coupled via a third outer hollow shaft as well as with an interposition of the first shifting clutch D to the web of the fourth planetary gear. The web of the fourth planetary gear can be connected in a fixed manner via its third connection flange to the output shaft.

In the multispeed transmission described above, the first clutch D can be opened in the lower gear ratio, which is to say in the first, the second and the third gear ratio, while in the first gear ratio and in the third gear ratio, the second shifting clutch C can be closed. On the other hand, in the second gear ratio, the third shifting clutch E can be closed and the second shifting clutch C can be opened.

In order to provide the coasting mode, the second shifting clutch C can be opened in the first gear ratio or in the third gear ratio. The third shifting clutch E can be opened in order to provide the coasting mode in the second gear ratio. On the other hand, the first shifting clutch D can be opened in order to provide the coasting mode in the fourth through the eighth gear ratio.

The advantageous embodiments mentioned above and/or further developments of the invention which are described in the dependent claims—with the exception of unambiguous dependencies or incompatible alternatives—can be used individually, but also in any desired combinations.

The invention and its advantageous embodiments and further developments as well as other advantages will be next explained in more detail with reference to figures.

BRIEF DESCRIPTION OF THE DRAWINGS

The figures show the following:

FIG. 2 a block diagram for switching gear ratios in a multispeed transmission.

DETAILED DESCRIPTION OF THE DRAWINGS

Figure 1:
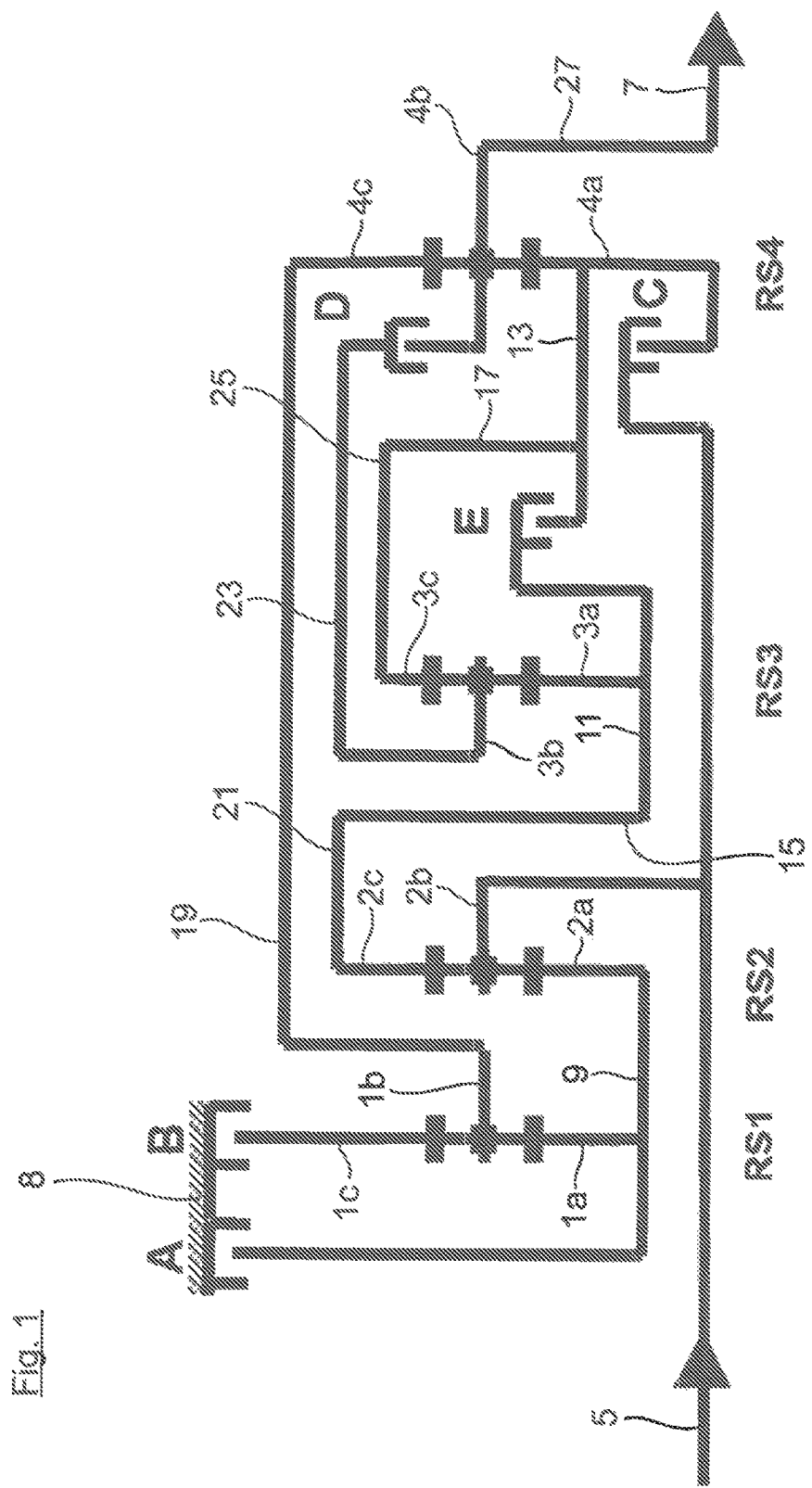
FIG. 1 a multispeed transmission with a planetary construction shown in a block diagram.

The construction of a multispeed transmission for a motor vehicle will be explained next based on FIG. 1. The multispeed transmission is provided with a total of four planetary gearings RS1 through RS4, which are switchable to different gear ratios with switching elements A, B, C, D.

They can be connected by means of input elements and output elements to a driven input shaft 5 and to an output shaft 7.

A torque converter, not shown, can be connected as a starting element upstream of the input shaft 5.

The four planetary gearings RS1 through RS4 can be switched by means of two brakes A, B and by means of the three clutches C, D, E, to eight forward gear ratios. As shown in FIG. 1, the four planetary gearings RS1 through RS4 are arranged axially one after another, so that the input shaft 5 is guided as a solid shaft through three inner hollow shafts 9, 11, 13 which are arranged axially one after another.

The inner hollow shaft 9 supports in a rotationally fixed manner in the torque flow direction the sun wheels 1a, 2a of the first and of the second planetary gearing RS1, RS2 and it can be braked by means of a brake A at the gear housing 8. The second inner hollow shaft 11 supports non-rotatably the sun wheel 3a of the third planetary gearing RS3 and it is fixedly connected via connecting flange 15 and via a second outer hollow shaft 21 to the hollow wheel 2c of the second planetary gearing RS2. In addition, the second inner hollow shaft 11 can be operationally connected via the third clutch E to the third inner hollow shaft 13.

The third inner hollow shaft 13 supports in a rotationally fixed manner the sun wheel 4a of the fourth planetary gearing RS4. Moreover, the third inner hollow shaft 13 can be connected via the second shifting clutch C to the input shaft 5, and via a second connecting flange 17 and a fourth outer hollow shaft 25 it can be connected in a rotationally fixed manner to the hollow wheel 3c of the third planetary drive RS3.

The web 1b of the first planetary gearing RS1 is connected via a radially external outer hollow shaft 10 in a rotationally fixed manner to the hollow wheel 4c of the fourth planetary gearing RS4. The hollow wheel 1c of the first planetary gearing RS1 can be locked by braking by means of a second brake B at the gear housing 8.

In addition, the web 3b of the third planetary gearing RS3 can be coupled via a third outer hollow shaft 23 as well as with the interposition of the first shifting clutch D to the web 4b of the fourth planetary gearing RS4, wherein the web 4b is connected in a fixed manner via a third connecting flange 27 to the output shaft 7.

The hollow wheel 1c of the first planetary gearing RS1 can be braked via a second brake 8 at the gear housing 8.

In this manner, an arrangement of the shifting clutches C, D, E can thus be provided near the output. The shifting clutches C, D, E are thus opened, depending on which gear ratios are engaged, for an activation of the coasting function. In such a coasting mode, which is to say with a decoupled drive machine, the drag torque, which is formed in the transmission due to the arrangement of the shift clutches C, D, E in the vicinity of output, is reduced.

As is apparent from the circuit diagram of FIG. 2, a total of eight forward gear ratios are switchable in the multispeed transmission. In the higher gear ratios, which is to say the fourth through the eight gear ratio, the first shifting clutch D is connected continuously in order to produce a force flow in the transmission. In the lower gear ratios, which is to say in the first, second and third gear ratio, the first shifting clutch D is opened. In addition, in the first and third gear ratio, the second shifting clutch C is closed, wherein the third shifting clutch E is closed in the second gear ratio.

According to the invention, the first shifting clutch D is opened in order to provide a coasting mode in the fourth through the eighth gear ratio, wherein the force flow in the transmission is interrupted.

However, in order to provide the coasting mode in the first or in the third gear ratio, the second shifting clutch C is opened. In order to provide the coasting mode in the second gear ratio, the third shifting clutch E is opened.

The invention claimed is:

1. A method for operating a multispeed transmission in a motor vehicle, provided with four planetary gearings switchable to different gear ratios with four switching elements, which can be connected via input elements and output elements to a driven input shaft and to an output shaft and whose reaction elements can be coupled or locked by braking, wherein the four planetary gearings can be switched by two brakes and by three shifting clutches to eight forward gear ratios, wherein in the higher gear ratios, in particular the fourth through the eight gear ratio, at least a first shifting clutch is continuously connected, and in order to establish a force flow in the transmission, in the lower gear ratios, in particular the first through the third gear ratio, at least a second and/or a third shifting clutch is connected in order to produce a force flow in the transmission, and wherein in the coasting mode with an engaged or connected gear ratio, the force flow in the transmission is interrupted by opening one of the shifting clutches, wherein in order to provide the coasting mode in the higher gear ratios, the first shifting clutch is opened, and that in order to provide the coasting mode in the lower transmission ratios, the second or the third shifting clutch is opened.

2. The method according to claim 1, wherein the four planetary gearings are arranged axially one after another, that the input shaft is guided inside the inner hollow shafts, which are arranged axially one after another and among which the first inner hollow shaft supports in a rotationally fixed manner the sun wheels of the first and of the second planetary gear, and which can be locked by braking via a brake at the gear housing, and the second inner hollow shaft supports in a rotationally fixed manner the sun wheel of the third planetary gearing, and is connected via a connecting flange and a second outer hollow shaft in a fixed manner to the hollow wheel of the second planetary gear and can be connected via the third shifting clutch in an operational manner to the third inner hollow shaft, wherein the third inner hollow shaft supports in a rotationally fixed manner the sun wheel of the fourth planetary gearing, and can be connected via the second shifting clutch to the input shaft and is connected in a fixed manner via a second connecting flange and a fourth outer hollow shaft to the hollow wheel of the third planetary gear.

3. The method according to claim 2, wherein the web of the first planetary gearing is connected in a rotationally fixed manner via a radially external outer hollow shaft to the hollow wheel of the fourth planetary gearing.

4. The method according to according to claim 1, wherein the hollow wheel of the first planetary gearing can be locked by braking by means of a second brake at the gear housing.

5. The method according to claim 1, wherein the web of the third planetary gear can be coupled via a third outer hollow shaft and with interposition of the first shifting clutch with the web of the fourth planetary gearing, wherein the web is connected in a fixed manner via a connecting flange to the output shaft.

6. The method according to claim 1, wherein in the lower gear ratios, which is to say in the first, second and third gear ratio, the first shifting clutch is opened, and that in the first and third gear ratio, the second shifting clutch is closed, and that in the second gear ratio, the third shifting clutch is closed.

7. The method according to claim 6, wherein the second shifting clutch is opened in order to provide the coasting mode in the first or in the third gear ratio.

8. The method according to claim 6, wherein the third shifting clutch is opened in order to provide the coasting mode in the second gear ratio.

\* \* \* \* \*

UNITED STATES PATENT AND TRADEMARK OFFICE
CERTIFICATE OF CORRECTION

PATENT NO. : 10,422,415 B2
APPLICATION NO. : 15/745826
DATED : September 24, 2019
INVENTOR(S) : Martin Enke and Dirk Morbitzer Page 1 of 1

It is certified that error appears in the above-identified patent and that said Letters Patent is hereby corrected as shown below:

On the Title Page

Item (12), should read: Enke et al.

Item (72), Inventor, after "Martin ENKE, Ingolstadt (DE)", please insert -- Dirk MORBITZER, Ravensburg, (DE) --.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*